US005436630A

United States Patent [19]
Nash

[11] Patent Number: 5,436,630

[45] Date of Patent: Jul. 25, 1995

[54] RADAR SHIELDS

[75] Inventor: William Nash, London, England

[73] Assignee: British Aerospace PLC, London, England

[21] Appl. No.: 535,946

[22] Filed: Mar. 16, 1990

[30] Foreign Application Priority Data

May 25, 1989 [GB] United Kingdom ................. 8912027

[51] Int. Cl.[6] ...................... H01Q 17/00; H01Q 15/14; G01S 7/495; G01S 7/537

[52] U.S. Cl. ......................................... 342/2; 342/10; 342/13

[58] Field of Search ................................ 342/2, 10, 13

[56] References Cited

U.S. PATENT DOCUMENTS 3,617,113 11/1971 Hoyer .............................. 342/10 X
3,699,576 10/1972 Hoyer .................................. 342/10
3,838,425 9/1974 Ishimitsu et al. ....................... 342/2
3,938,151 2/1976 Trenam ................................ 342/10
3,982,250 9/1976 Giannatto et al. ................. 343/872
4,044,358 8/1977 Manning et al. ......................... 342/2
4,926,181 5/1990 Stumm .................................. 342/5
5,173,699 12/1992 Barr et al. ............................. 342/2
5,250,950 10/1993 Scherrer et al. ........................ 342/2

FOREIGN PATENT DOCUMENTS 1030010 5/1966 United Kingdom .
1273642 5/1972 United Kingdom .

*Primary Examiner*—John B. Sotomayor
*Attorney, Agent, or Firm*—Cushman, Darby & Cushman

[57] ABSTRACT

A radar shield, in particular for an aircraft radar antenna, comprises a plurality of elongate triangular blinds 6 that may be stowed on individual rollers 7. To deploy the shield, the blinds are drawn from the rollers by wind-up spools to form a pyramidal shield within, for example, the aircraft radome assembly.

11 Claims, 3 Drawing Sheets

RADAR SHIELDS

BACKGROUND OF THE INVENTION

This invention relates to a radar shield, and in particular to a shield for an aircraft radar antenna.

In recent years substantial efforts have been made to design military aircraft that present a reduced radar signature to enemy radar so as to improve their 'stealth' characteristics. A major problem that has been encountered, however, is that an aircraft's own radar antenna provides a strong reflected radar signal.

Accordingly various proposals have been made in the past for providing shields suitable for an aircraft radar antenna, with various degrees of success. A particular problem encountered in the design of such shields is that they must not, of course, seriously interfere with the performance of the aircrafts own radar system.

DESCRIPTION OF THE INVENTION

According to the present invention there is provided a radar shield comprising a plurality of blinds, each said blind being adapted to be reciprocated between a stowed position when not in use, and in use a deployed position in which said blinds co-operate to form a shield.

By means of this arrangement there is provided a radar shield that may be quickly, simply and repeatably switched between a deployed condition and a stowed condition in which it does not interfere with normal operation of the radar. Furthermore, since the shield is formed from a number of individual blinds, the shield will have a multi-facetted structure that is particularly advantageous in presenting a reduced radar return.

In a preferred embodiment the blinds are triangular in shape and the shield, in use, is generally pyramidal with each blind forming one face of the pyramid.

In a particularly preferred arrangement each blind is fixed to a respective roller on which it may be stowed, the blinds being drawn from their stowed positions to their deployed positions by means of a draw line attached to each blind and leading to a respective wind-up spool To return the blinds to their stowed positions after use the rollers may be spring-loaded. Alternatively, each roller may be linked to and driven with its associated wind-up spool such that rotation of the spool in one direction causes the blind to be drawn from the roller, while rotation of the spool in the opposite direction causes the blind to be wound around the roller.

The blinds may be made of a radar reflective material, such as metal or metallised plastic, so that incident radar radiation is reflected in a specular manner rather than being reflected to a receiver or the blinds may be made of a radar absorbent material.

The edges of each blind may be fitted with a row of bristles made from electrically conducting material such as carbon fibre, for example. Thus, when the blinds are deployed, the bristles on adjacent blinds intermesh, providing an electrically conducting joint between the adjacent blinds.

The radar shield is particularly suitable for use in an aircraft radome assembly, where the shield may take a pyramidal form with the apex of the pyramid being coincident, at least approximately, with the radome tip and the roller elements being disposed generally around and rearwardly of the radar antenna.

DESCRIPTION OF THE DRAWINGS

An embodiment of the invention will now be described by way of example and with reference to the accompanying drawings, in which.

Figure 1:
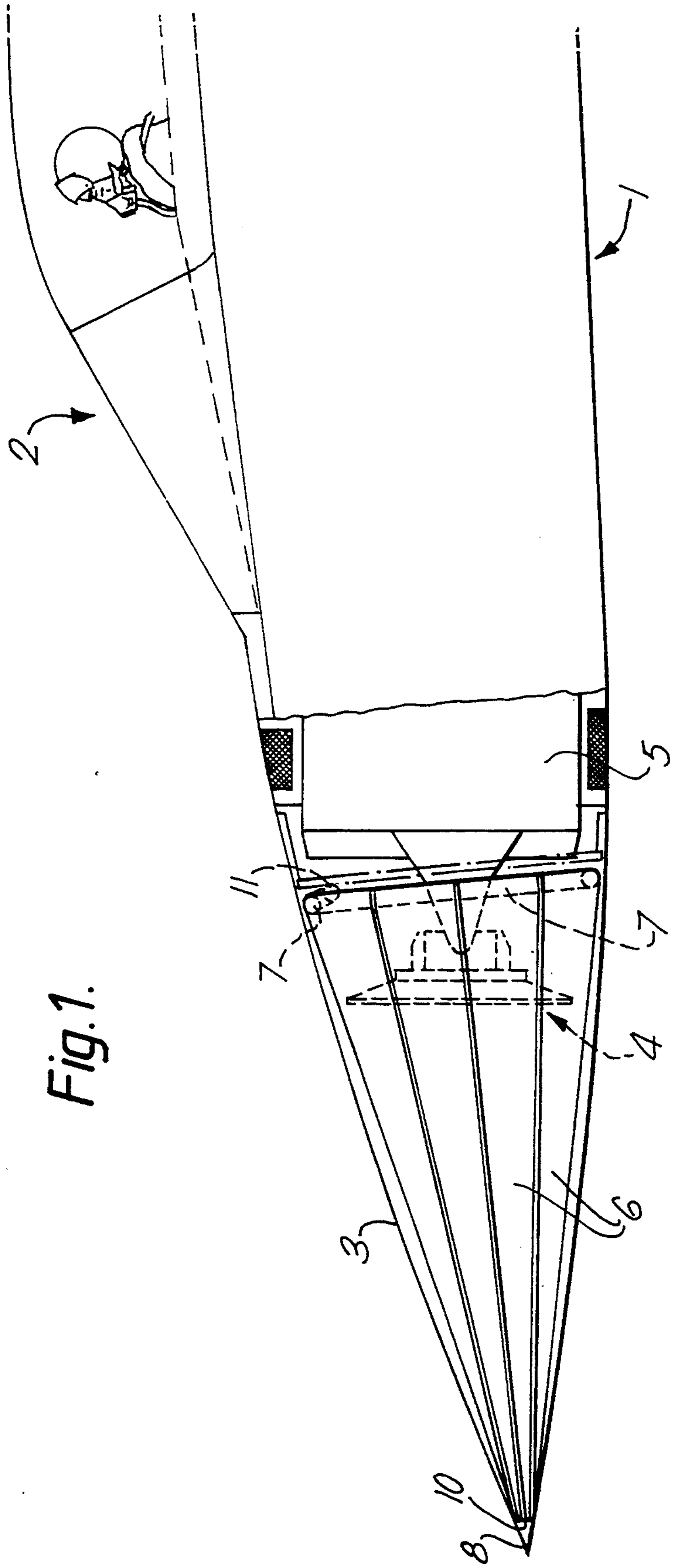
FIG. 1 is a partly sectional side view of the front portion of an aircraft.
Figure 2:
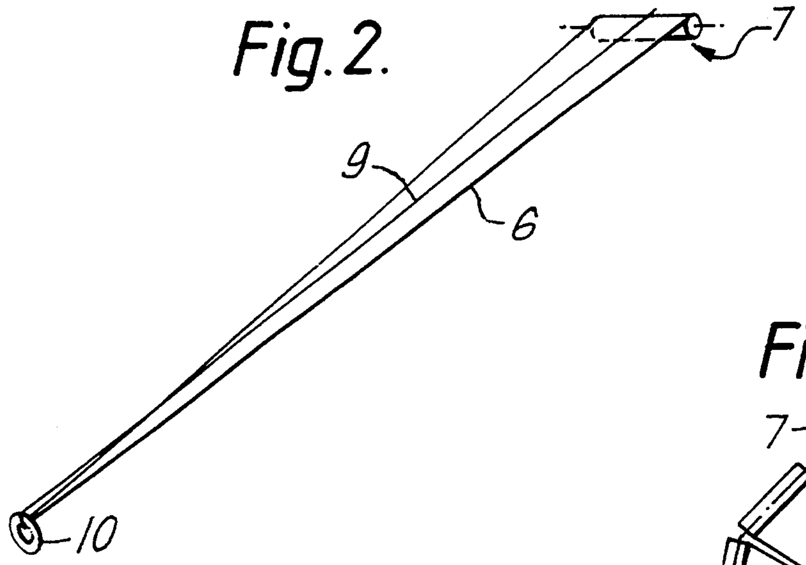
FIG. 2 is a perspective view of one blind.

Referring firstly to FIG. 1 there is shown the front portion of an aircraft including the fuselage 1, cockpit 2 and a radome 3. The radome 3 houses a forwardly directed radar antenna 4 together with its associated electronics 5.

Surrounding the radar antenna 4 is a radar shield formed from a plurality of generally elongate triangular blinds 6, the short ends of which are mounted on, or attached to, rollers 7. The rollers 7 are disposed in a generally circular manner about the periphery of the antenna 4, but disposed rearwardly thereof.

Figure 3:
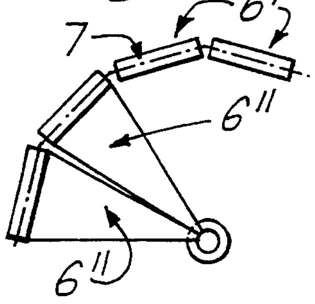
FIG. 3 is a front elevation showing a part of the radar shield in its two conditions, FIG. 4(*a*) and (*b*) show alternative guide members for the blind draw lines.

When in their deployed condition, shown in FIG. 1, the triangular blinds 6 form a pyramidal shield the apex of which is generally coincident with the tip of the radome 8. In their stowed condition, each blind 6 is wound around its respective roller 7. FIG. 3 shows two blinds 6' stowed, and two 6'' deployed, though it will be appreciated that this is for convenience of illustration only and normally the blinds will be stowed and deployed together.

Figure 4A:
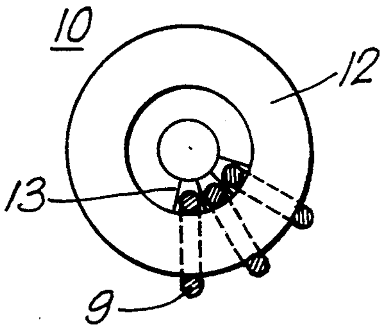
Figure 4B:
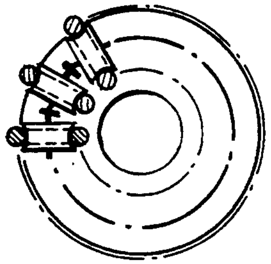

To unwind the blinds 6 from their stowed condition on rollers 7, a drawline 9 is attached to each blind 6 and leads via a guide element 10 back over the blind 6 and roller 7 to a wind-up spool 11 positioned adjacent each respective roller 7. A single guide element 10 is provided for all the draw lines 9. As shown in FIG. 4(*a*) the guide element may comprise a ring 12 of a low friction material such as polytetrafluoroethylene (PTFE) or the like. The draw lines 9 are threaded through the centre of the ring 12 and then over the ring to the wind-up spools 11. In the centre of the ring 12 radial dividing spars 13 may be provided to separate the drawlines 9. Alternatively, as shown in FIG. 4(*b*), the guide element may comprise a ring of rotatably mounted individual pulleys 14, one for each draw line 9.

Figure 5:
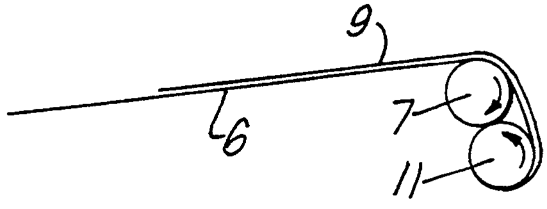
FIG. 5 shows one possible arrangement of roller element and wind-up spool.

To deploy the blinds 6 from their stowed positions the wind-up spools 11 are rotated, for example by means of a continuous circular torque transmitting cable (as will be described below) extending through the spools 11 driven at one end by a motor, to wind-up draw lines 9 and thus unwind the blinds 6 from rollers 7. To provide the necessary force to rewind the blinds 6 on rollers 7, when it is desired to stow away the shield, the rollers 7 may be spring-loaded. Alternatively, as shown in FIG. 5, each wind-up spool 11 and associated roller 7 may be linked and driven together so that they rotate together, but in opposite senses. In this way rotation of spool 11 to wind-up draw line 9, ie, clockwise in FIG. 5, will cause the roller to rotate so as to unwind blind 6, while rotation of spool 11 to unwind draw line 9, ie, anti-clockwise in FIG. 5, causes the roller 7 to rotate to take up the blind 6.

Figure 6:
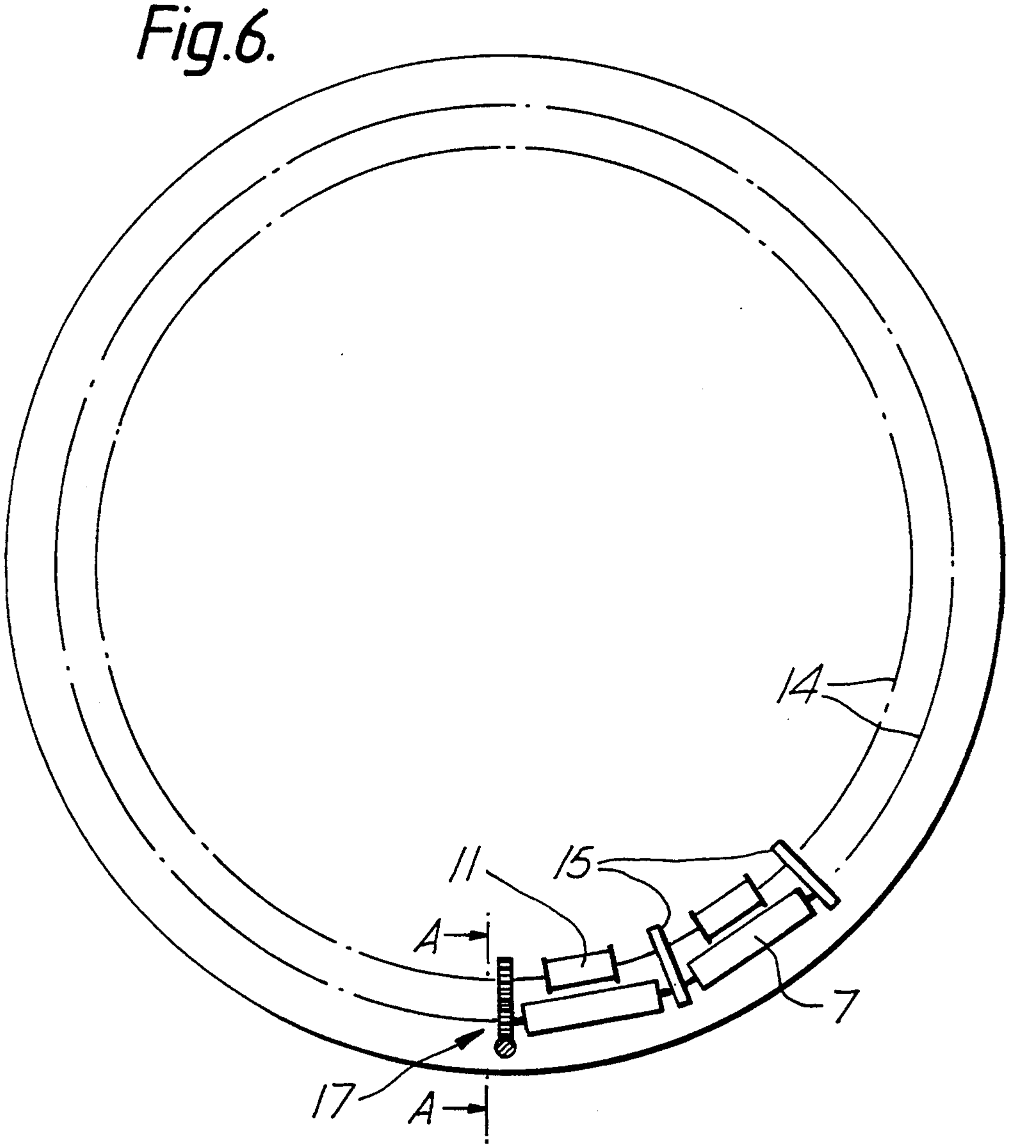
FIG. 6 is a front view of the shield showing the drive system.
Figure 7:
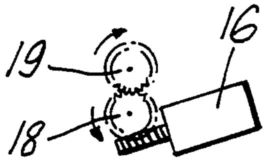
FIG. 7 is a view along line A—A of FIG. 6.

FIGS. 6 and 7 illustrate a possible method of driving the rollers 7 and wind-up spools 11. The associated pairs of rollers and spools are rotatably mounted between support brackets 15, the brackets 15 including the necessary bearings and are caused to rotate by separate continuous ring drives 14. The ring drives 14 may be of either the cable or continuous link type. It will of course be appreciated that although only two rollers and spools are shown in FIG. 6, this is for clarity only and further rollers 7, spools 11 and brackets 15 will be provided to form a generally circular array.

The ring drives 14 are driven by a single motor 16 through gearing 17. Gearing 17 includes meshing drive gears 18, 19 for the roller drive and spool drive respectively. It will be noted that this arrangement ensures that the rollers 7 and wind-up spools 11 are always rotated in opposite directions as discussed above. If necessary, each roller 7 may be provided with an inner spring to act as a tensioner for the draw string 9 and blind 6.

The blinds may be made of a radar reflective material such as metallic foil or tough metallised plastic. Since each blind will present a flat surface, and the whole shield is of a pyramidal form, any incident radar signal will thus be reflected in a specular manner rather than back to the radar transmitter.

It will be appreciated that the shield can be quickly and repeatably switched between stowed and deployed conditions by appropriate control of the wind-up spools 11.

I claim:

1. A radar shield comprising:

a plurality of blind elements, each said blind element being adapted to be reciprocated between a stowed position when not in use, and a deployed position in which said blinds cooperate to form a shield when in use, each of said blind elements having an associated draw-line attached to a first end thereof, a wind-up spool around which each said draw-line is selectively wound and unwound and a roller associated with each said draw-line, a second end of said blind being fixed to its associated roller on which it can be stowed as wound around said roller when not in use by said draw-line being unwound, and deployed as unwound from said roller when in use, by said draw-line being wound.

2. A radar shield according to claim 1 wherein said blinds are triangular in shape and the shield, in use, is generally pyramidal with each blind forming one face of the pyramid.

3. A radar shield according to claim 1 wherein said rollers are spring-loaded to cause said blinds to be stowed on said rollers after use.

4. A radar shield according to claim 1 wherein each said roller is linked to and driven with its associated wind-up spool such that rotation of said spool in one direction causes said blind to be drawn from said roller, while rotation of said spool in the opposite direction causes said blind to be wound around said roller.

5. A radar shield according to claim 1 wherein said blinds are made of a radar reflective material.

6. A radar element according to claim 1 further comprising a radar antenna housed within a radome and a shield for said antenna.

7. A radar element according to claim 2 further comprising a radar antenna housed within a radome and a shield for said antenna, wherein the apex of said pyramidal shield is located in a region of a tip of the radome, and a base of the pyramid is located rearwardly of the antenna.

8. A radar shield, comprising:

a plurality of sheets of radar reflective material, each sheet having a first end and a second end;

a plurality of rollers, each attached to a first end of a sheet to which each said roller is associated, and around which said sheet can be rolled, said sheets being in a stowed position when totally rolled around said roller, and being in a deployed position when totally unwound from said roller; and a plurality of means for unwinding each said sheet from each said roller, by pulling each said sheet towards a common apex point, the sheets when unwound thereby providing a radar shield which converges at said apex point.

9. A radar shield according to claim 8 wherein said means for unwinding comprise draw strings coupled to said second end of each said sheet, and a wind-up spool for pulling said draw strings toward said apex point.

10. A radar shield as in claim 9 wherein each said sheet is triangular in shape.

11. A radar antenna and shield assembly for a pointed-nose aircraft comprising:

a radar antenna mounted spaced from said pointed nose and pointing towards said pointed nose;

a plurality of rollers, mounted behind said radar antenna and farther away from said pointed nose than said radar antenna, and surrounding said radar antenna;

a plurality of triangular-shaped sheets of radar reflective material, each sheet having a first end coupled to one of said rollers, and a second end, which is a narrower end of the triangle, including attaching means thereon;

a draw string, coupled to said attaching means; and pulling means for pulling said sheets toward said pointed nose of said aircraft to deploy said sheets and engage said radar shield, and releasing tension on said draw strings to release said sheets to be wound around said rollers to maintain said sheets stowed around said rollers.

* * * * *